United States Patent
Ito

(10) Patent No.: US 6,996,270 B1
(45) Date of Patent: Feb. 7, 2006

(54) METHOD, APPARATUS, AND RECORDING MEDIUM FOR FACIAL AREA ADJUSTMENT OF AN IMAGE

(75) Inventor: Wataru Ito, Kaisei-machi (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/510,190

(22) Filed: Feb. 22, 2000

(30) Foreign Application Priority Data

Feb. 19, 1999 (JP) ............................. 11-041445

(51) Int. Cl.
*G06K 9/00* (2006.01)

(52) U.S. Cl. ..................... 382/167; 382/190; 382/274; 358/518

(58) Field of Classification Search ............... 382/162, 382/167, 117, 118, 164, 165, 190, 272, 274; 348/453; 358/518, 520, 538
See application file for complete search history.

(56) References Cited

U.S. PATENT DOCUMENTS

| | | | | |
|---|---|---|---|---|
| 5,042,078 A | * | 8/1991 | Oshikoshi et al. | 382/167 |
| 5,278,921 A | | 1/1994 | Nakamura et al. | |
| 5,353,058 A | * | 10/1994 | Takei | 348/363 |
| 5,524,069 A | * | 6/1996 | Inoue | 382/270 |
| 5,572,635 A | * | 11/1996 | Takizawa et al. | 345/426 |
| 5,657,395 A | * | 8/1997 | Hirota | 382/163 |
| 5,852,675 A | * | 12/1998 | Matsuo et al. | 382/167 |
| 5,940,530 A | * | 8/1999 | Fukushima et al. | 382/164 |
| 5,978,100 A | * | 11/1999 | Kinjo | 358/453 |
| 5,990,901 A | * | 11/1999 | Lawton et al. | 345/581 |
| 6,023,524 A | * | 2/2000 | Yamaguchi | 382/162 |
| 6,046,723 A | * | 4/2000 | Daniels et al. | 345/600 |
| 6,122,408 A | * | 9/2000 | Fang et al. | 382/274 |
| 6,141,442 A | * | 10/2000 | Chen | 382/166 |
| 6,240,217 B1 | * | 5/2001 | Ercan et al. | 382/274 |
| 6,389,155 B2 | * | 5/2002 | Funayama et al. | 382/118 |
| 6,574,362 B1 | * | 6/2003 | Kita | 382/162 |

FOREIGN PATENT DOCUMENTS

| | | |
|---|---|---|
| JP | A 5-274438 | 10/1993 |
| JP | A 5-307605 | 11/1993 |
| JP | A 8-110603 | 4/1996 |
| JP | 08237485 A * | 9/1996 |

OTHER PUBLICATIONS

Gonzalez et al, Digital Image Processing, 1993, Addison-Wesley Publishing Company, p 192.*
Mark D. Fairchild, Assison-Wesley, 1998, pp. 130, and 133-139.

* cited by examiner

*Primary Examiner*—Yon J. Couso
(74) *Attorney, Agent, or Firm*—Birch, Stewart, Kolasch & Birch LLP

(57) ABSTRACT

A face area in an image including a figure is perceived to have appropriate color and/or density without being affected by color and/or density of an area surrounding the face area. Face area extracting means extracts a face area from an image including a figure, and surrounding color density detecting means detects color density information indicating color and/or density (color density) of an area surrounding the face area. Adjusting means adjusts color density of the face area based on the color density information detected by the surrounding color density information detecting means. By reproducing the image after the adjustment, the face area is perceived to have appropriate color density without being affected by the color density of the surrounding area.

19 Claims, 3 Drawing Sheets

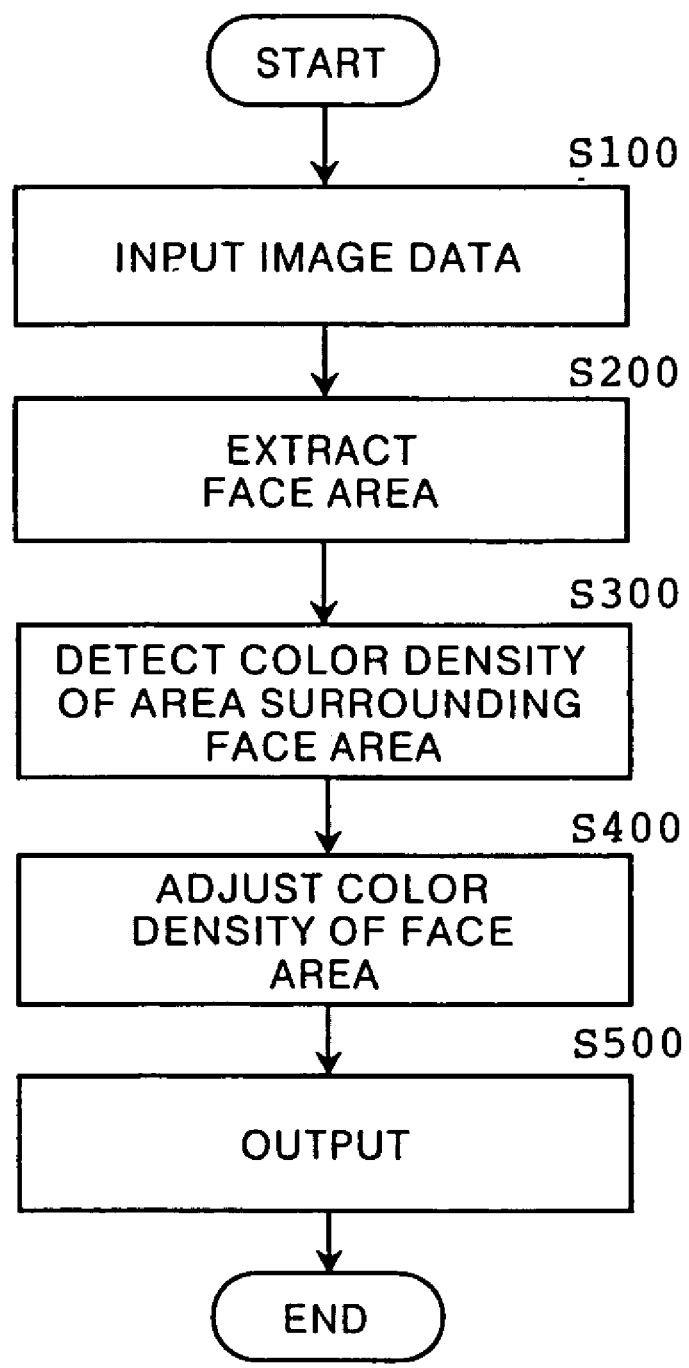

METHOD, APPARATUS, AND RECORDING MEDIUM FOR FACIAL AREA ADJUSTMENT OF AN IMAGE

BACKGROUND OF THE INVENTION

1. Field of the Invention

The present invention relates to an image processing method and an image processing apparatus for carrying out image processing on an image including a figure, and also to a computer-readable recording medium storing a program to cause a computer to execute the image processing method.

2. Description of the Related Art

When a portrait is viewed, most attention is paid to the face of the person therein. In order to generate a high-quality photograph, the color and/or density of the face of a figure in the photograph needs to be corrected. Therefore, a method of generating a portrait having appropriate color and/or density of the face of a figure therein has been proposed (see Japanese Unexamined Patent Publication No. 6(1994)-67320, for example). In this method, a candidate area for a face is extracted by dividing a portrait based on distributions of hue and chroma values of the portrait and a face area is extracted based on a shape of an area positioned close to the candidate area. By determining exposure of a photosensitive material based on color and/or density of the face area, color and density of the face of the person become appropriate. Another method of generating a photograph including a figure whose face has appropriate color and/or density has also been proposed (see Japanese Unexamined Patent Publication No. 8(1996)-110603). In this method, a face area of a figure is extracted from a photograph generated in uneven lighting due to shade or a flash, and exposure is determined by removing the illumination variance from the face area. In this manner, each face has appropriate color and/or density in the photograph.

However, in recognition of color and density of a target area, it has been known that human vision is affected by color and density of areas surrounding the target area (Color Appearance Model, M. D. Fairchild, ADDISON-WESLEY, 1998). In other words, when surroundings are dark, an object therein looks light, while the object looks dark when the surroundings are light, even if the density of the object is actually the same in both cases. For example, when two areas having the same gray density are viewed in equal-density backgrounds, the two areas are perceived to have the same density. However, when the same areas are viewed on black and white backgrounds respectively, the density is perceived to be different between the two areas.

Therefore, even if the processing for appropriately correcting color and density of the face area is carried out as described in Japanese Unexamined Patent Publication Nos. 6(1994)-67320 and 8(1996)-110603, the color and the density of the face area may not become appropriate due to the effect caused by color and density of areas surrounding the face area.

SUMMARY OF THE INVENTION

The present invention has been conceived based on consideration of the above problems. An object of the present invention is to provide an image processing method and an image processing apparatus for carrying out image processing causing color and/or density of the face of a person to become appropriate without being affected by the surroundings, and also to provide a computer-readable recording medium storing a program to cause a computer to execute the image processing method.

An image processing method of the present invention is a method of carrying out image processing on an image including a figure, and the image processing method comprises the steps of:

extracting a face area of the figure from the image; and adjusting density and/or color of the face area based on density information and/or color information of an area surrounding the face area.

As a method of "extracting the face area", not only the methods described in Japanese Unexamined Patent Publication Nos. 6(1994)-67320 and 8(1996)-110603 but also a method of manual extraction of a face area by an operator using a light pen and a method of extracting a face area by using a neural network described in Japanese Unexamined Patent Publication No. 5(1993)-274438 or 5(1993)-307605 may be used, for example.

An image processing apparatus of the present invention is an apparatus for carrying out image processing on an image including a figure, and the image processing apparatus comprises:

face area extracting means for extracting a face area of the figure from the image; and adjusting means for adjusting density and/or color of the face area based on density information and/or color information of an area surrounding the face area.

The image processing method of the present invention may be provided as a program recorded in a computer-readable recording medium to cause a computer to execute the processing.

According to the present invention, since the density and/or the color of the face area is adjusted by using the density and/or color information of the surrounding area, the density and/or the color of the face area can be perceived appropriately without being affected by the density and the color of the surrounding area.

BRIEF DESCRIPTION OF THE DRAWINGS

FIG. 5 is a flow chart showing an operation of the embodiment.

DESCRIPTION OF THE PREFERRED EMBODIMENT

Figure 1:
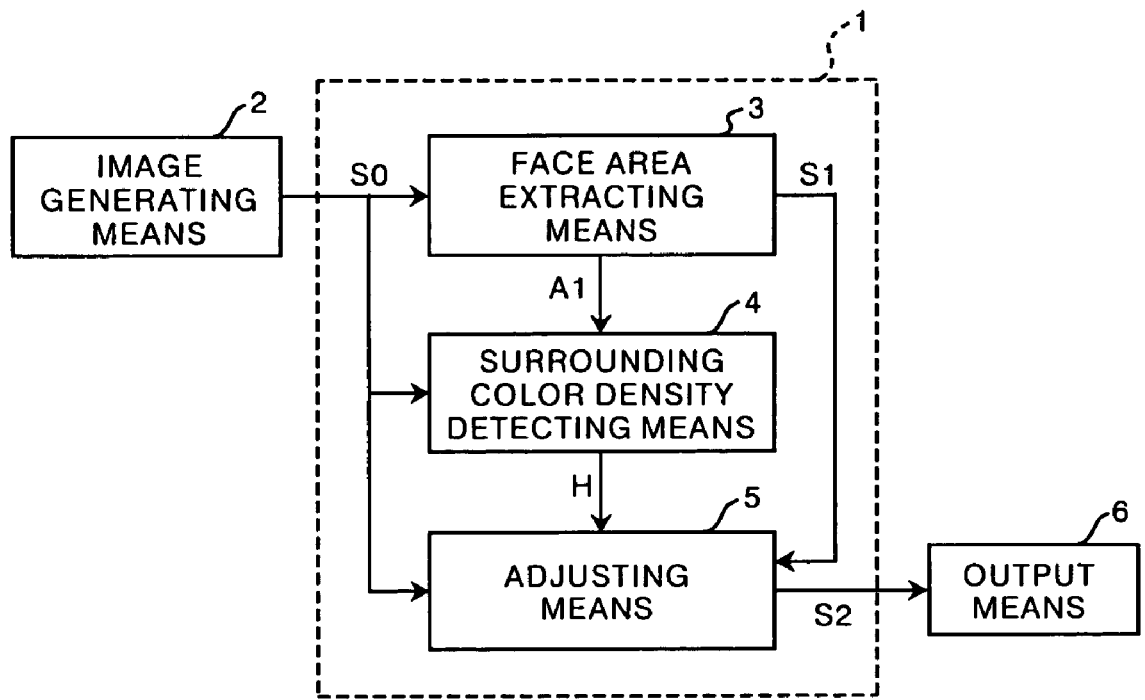
FIG. 1 is a block diagram showing an outline configuration of an image processing apparatus according to an embodiment of the present invention.

Hereinafter, an embodiment of the present invention will be explained with reference to the accompanying drawings. FIG. 1 is a block diagram showing an outline configuration of an image processing apparatus according to the embodiment of the present invention. As shown in FIG. 1, an image processing apparatus 1 according to this embodiment is for carrying out processing on image data S0 representing an image including a figure obtained by image generating means 2 such as a digital camera or a scanner. The image processing apparatus 1 comprises face area extracting means 3 for extracting a face area A1 of the figure from the image represented by the image data S0, surrounding color density detecting means 4 for detecting color and/or density (hereinafter called color density) of an area surrounding the face area A1 as color density information H, and adjusting means 5 for obtaining processed image data S2 by carrying out processing for adjusting color density on image data S1 representing the face area A1 extracted by the face area extracting means 3, based on the color density information H of the area surrounding the face area A1 detected by the surrounding color density detecting means 4. The processed image data S2 are output by output means 6 such as a printer or a monitor.

In the face area extracting means 3, the face area is extracted by using a conventional method. As this method, the methods described in Japanese Unexamined Patent Publication Nos. 6(1994)-67320 and 8(1996)-110603, or the method of manual extraction of the face area by an operator using a light pen, or the method of extracting the face area by using the neural network described in Japanese Unexamined Patent Publication No. 5(1993)-274438 or 5(1993)-307605 can be used, for example.

Figure 2:
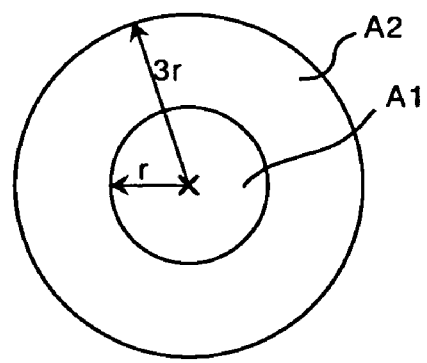
FIG. 2 is a diagram for explaining detection of color and/or density of an area surrounding a face area (part 1)
Figure 3:
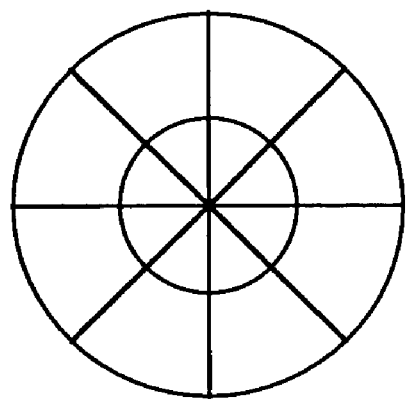
FIG. 3 is a diagram for explaining detection of the color and/or density of the surrounding area (part 2)

The surrounding color density detecting means 4 determines the area surrounding the face area A1 extracted by the face area extracting means 3, and calculates an average density of pixels in the surrounding area as the color density information H. More specifically, for example, in the case where the face area A1 is extracted as a circular area shown in FIG. 2, a concentric area excluding the face area A1 and having a radius $3r$, which is 3 times a radius r of the face area A1, is set as a surrounding area A2. The average density of the surrounding area A2 is calculated as the color density information H. When the average is calculated, it is preferable for any pixels having high saturation to be excluded. Furthermore, as shown in FIG. 3, the surrounding area A2 may be divided into eight areas so that a median of averages of the density of pixels in the eight areas is calculated. In this manner, fluctuation of the density of the surrounding area A2 caused by a minute high-saturation area is prevented. Moreover, the surrounding color density area detecting means 4 may find color of the surrounding area A2 and include information regarding the color in the color density information H.

The adjusting means 5 adjusts density of the face image data S1 representing the face area A1, based on the color density information H of the surrounding area A2 found by the surrounding color density detecting means 4. For example, when the density of the surrounding area A2, which is the average found in the above manner, is Q and when the density of the face area A1 is K, a signal value of each pixel in the face area A1 is adjusted according to the following equation (1):

$$K_{new}=K+\beta(Q-K) \quad (1)$$

Figure 4:
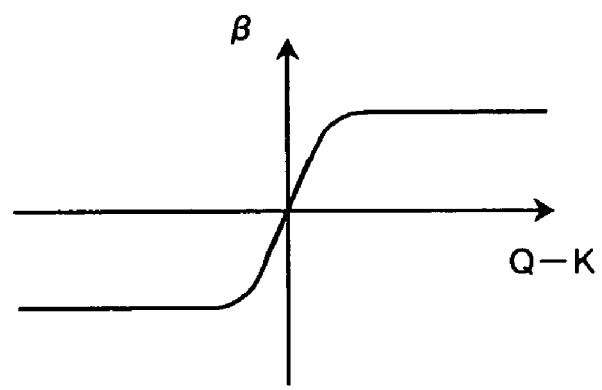
FIG. 4 is a graph showing a function used in an operation for adjusting density.

In Equation (1), $K_{now}$ is a pixel value after the processing, and β is a table as shown in FIG. 4. By carrying out an operation shown by Equation (1), the density of the face area A1 is corrected to become higher if the density of the surrounding area is higher than the density of A1. If the density of the surrounding area is lower than the density of the face area A1, the density of the face area A1 is lowered. In the above equation, β may be a constant. Furthermore, the signal value of each pixel in the face area A1 may be corrected according to the following equation (2):

$$K_{new}=K+\alpha\cdot\beta(Q-K) \quad (2)$$

In Equation (2), α is a function whose value changes in accordance with the color of the face area A1. The closer to skin color the hue of the pixel having the value K becomes in a chromaticity diagram, the closer to 1 the value α becomes. The value α becomes closer to 0 the more the hue is different from the skin color. In this manner, even in the case where the face area A1 is extracted as an area including not only a skin-color portion but also hair or the like, the density of the skin-color area is corrected substantially in the face area A1. Therefore, the density is not changed unnaturally at a border of the face area A1.

In the adjusting means 5, the density of the face area A1 may be corrected by using not only Equations (1) and (2) but also a table showing a relationship between $K_{new}$ and Q–K generated in advance. In the case where the density information H includes information regarding color of the surrounding area A2, the color of the face area A1 may be corrected based on the color of the surrounding area A2. For example, when the surrounding area A2 is blue, the complexion looks pale since the color of the face area A1 is perceived to be bluish. Therefore, it is preferable for the color of the face area A1 to be converted into a reddish color. Furthermore, only the color of the face area A1 may be corrected based on the color of the surrounding area A2, by letting the color density information H be information regarding color only.

An operation of an embodiment of the present invention will be explained next. FIG. 5 is a flow a chart showing the operation of this embodiment. The image data S0 generated by the image generating means 2 are input to the image processing apparatus 1 (Step S100). In the image processing apparatus 1, the face area extracting means 3 extracts the face area A1 of a figure (Step S200). The image data representing the face area A1 are the image data S1. The surrounding color density detecting means 4 detects the color density information H of the area surrounding the face area A1 (Step S300). Based on the color density information H, the adjusting means 5 adjusts the color density of the face area A1 as has been described above, and the processed image data S2 are obtained (Step S400). The processed image data S2 are output by the output means 6 (Step S500).

As has been described above, according to this embodiment, the color density of the face area A1 is corrected based on the color density of the area surrounding the face area A1. Therefore, the face area A1 can be corrected to have appropriate color density, without being affected by the color density of the surrounding area.

In the above embodiment, the processing is carried out on the image data S0 obtained by the image generating means 2. However, the processing may be carried out on an image having been corrected to have appropriate density of the face area A1 according to the method described in Japanese Unexamined Patent Publication No. 6(1994)-67320 or 8(1996)-110603. In this case, face area extracting means of an apparatus for carrying out the above method can be used as the face area extracting means of the present invention.

What is claimed is:

1. An image processing method for carrying out image processing on an image, the image processing method comprising the steps of:

selecting an area in the image, such that the image includes a selected image area and a non-selected image area; and adjusting at least one of: density of the image at the selected image area based on density information of part of the non-selected area in the image surrounding the selected image area so as to compensate for an effect of density of the surrounding part of the non-selected image area on visual perception of the density of the selected image area; and color of the image at the selected image area based on color information of the surrounding part of the non-selected image area so as to compensate for an effect of color of the surrounding part of the non-selected image area on visual perception of the color of the selected image area.

2. The image processing method of claim 1, wherein the selecting step selects a face area of a figure in the image as the selected image area.

3. A computer-readable recording medium storing a program to cause a computer to execute a method of carrying out image processing on an image, the program comprising the procedures of:

selecting an area in the image, such that the image includes a selected image area and a non-selected image area; and adjusting at least one of: density of the image at the selected image area based on density information of part of the non-selected area in the image surrounding the selected image area so as to compensate for an effect of density of the surrounding part of the non-selected image area on visual perception of the density of the selected image area; and color of the image at the selected image area based on color information of the surrounding part of the non-selected image area so as to compensate for an effect of color of the surrounding part of the non-selected image area on visual perception of the color of the selected image area.

4. An image processing apparatus for carrying out image processing on an image, the image processing apparatus comprising:

a selector selecting an area in the image, such that the image includes a selected image area and a non-selected image area; and an adjustor adjusting at least one of: density of the image at the selected image area based on density information of part of the non-selected area in the image surrounding the selected image area so as to compensate for an effect of density of the surrounding part of the non-selected image area on visual perception of the density of the selected image area; and color of the image at the selected image area based on color information of the surrounding part of the non-selected image area so as to compensate for an effect of color of the surrounding part of the non-selected image area on visual perception of the color of the extracted image area.

5. The image processing method of claim 1, further comprising:

designating the part of the non-selected image area surrounding the selected image area as a concentric area in the image excluding the selected image area.

6. The image processing method of claim 1, further comprising:

determining the surrounding part of the non-selected image area such that the surrounding part of the non-selected image area has a radius of 3 times a radius of the selected image area.

7. The image processing method of claim 1, further comprising:

dividing the surrounding part of the non-selected image area into sub areas; and calculating an average pixel density of each sub area.

8. The image processing method of claim 1, further comprising:

calculating density and/or color information of the surrounding part of the non-selected image area.

9. The image processing method of claim 2, wherein:

the selecting step selects a flesh area of the face area of the figure in the image as the selected image area, the adjusting step adjusting at least one of density and color of the image at the flesh area.

10. An image processing method for carrying out image processing on an image, the image processing method comprising the steps of:

selecting an area in the image, such that the image includes a selected image area and a non-selected image area; and adjusting a density of the image at the selected image area based on density information of part of the non-selected area in the image surrounding the selected image area so as to compensate for an effect of density of the surrounding part of the non-selected image area on visual perception of the density of the selected image area.

11. An image processing apparatus for carrying out image processing on an image, the image processing apparatus comprising:

selecting means for selecting an area in the image, such that the image includes a selected image area and a non-selected image area; and adjusting means for adjusting at least one of: density of the image at the selected image area based on density information of part of the non-selected area in the image surrounding the selected image area so as to compensate for an effect of density of the surrounding part of the non-selected image area on visual perception of the density of the selected image area; and color of the image at the selected image area based on color information of the surrounding part of the non-selected image area so as to compensate for an effect of color of the surrounding part of the non-selected image area on visual perception of the color of the selected image area.

12. The image processing method of claim 1, wherein the adjusting step adjusts the density of the image by:

increasing the density of the selected image area if the density of the surrounding part of the non-selected image area is higher than the selected image data; and decreasing the density of the selected image area if the density of the surrounding part of the non-selected image area is lower than the density of the selected image area.

13. The image processing method of claim 12, wherein the adjusting step adjusts the density of the image by determining a new density $K_{new}$ of the selected image area according to:

$$K_{new} = K + \beta(Q-K)$$

where

K=density of the selected image area before the adjusting is performed;

Q=density of the surrounding part of the non-selected image area; and $\beta$=predetermined function, which generates a negative value when K>Q, and generates a positive value when K<Q.

14. The image processing method of claim 12, wherein the adjusting step adjusts the density of the image by determining a new density $K_{new}$ of the selected image area according to:

$$K_{new}=K+\alpha\cdot\beta(Q-K),$$

where
- K=density of the selected image area before the adjusting is performed;
- Q=density of the surrounding part of the non-selected image area;
- α=a function whose value changes according to the color of the selected image area; and
- β=a predetermined function, whose value is negative value when K>Q, and whose value is positive when K<Q.

15. An image processing method for carrying out image processing on an image, the image processing method comprising the steps of:
    inputting an image having a plurality of pixel signal values;
    selecting an area in the image;
    adjusting pixel signal values in the selected image area in order to adjust at least one of: density of the image at the selected image area based on density information of an area in the image surrounding the selected image area so as to compensate for an effect of density of the surrounding image area on visual perception of the density of the selected image area; and color of the image at the selected image area based on color information of the surrounding image area so as to compensate for an effect of color of the surrounding image area on visual perception of the color of the selected image area; and
    outputting the image including the adjusted pixel signal values.

16. An image processing apparatus for carrying out image processing on an image, the image processing apparatus comprising:
    inputting means for inputting an image having a plurality of pixel signal values;
    selecting means for selecting an area in the image;
    adjusting means for adjusting pixel signal values in the selected image area in order to adjust at least one of: density of the image at the selected image area based on density information of an area in the image surrounding the selected image area so as to compensate for an effect of density of the surrounding image area on visual perception of the density of the selected image area; and color of the image at the selected image area based on color information of the surrounding image area so as to compensate for an effect of color of the surrounding image area on visual perception of the color of the selected image area; and
    outputting means for outputting the image including the adjusted pixel signal values.

17. A computer-readable recording medium storing a program to cause a computer to execute a method of carrying out image processing on an image, the program comprising the procedures of:
    inputting an image having a plurality of pixel signal values;
    selecting an area in the image;
    adjusting pixel signal values in the selected image area in order to adjust at least one of: density of the image at the selected image area based on density information of an area in the image surrounding the selected image area so as to compensate for an effect of density of the surrounding image area on visual perception of the density of the selected image area; and color of the image at the selected image area based on color information of the surrounding image area so as to compensate for an effect of color of the surrounding image area on visual perception of the color of the selected image area; and
    outputting the image including the adjusted pixel signal values.

18. An image processing apparatus for carrying out image processing on an image, the image processing method comprising the steps of:
    an input inputting an image having a plurality of pixel signal values;
    a selector selecting an area in the image;
    an adjustor adjusting pixel signal values in the selected image area in order to adjust at least one of: density of the image at the selected image area based on density information of an area in the image surrounding the selected image area so as to compensate for an effect of density of the surrounding image area on visual perception of the density of the selected image area; and color of the image at the selected image area based on color information of the surrounding image area so as to compensate for an effect of color of the surrounding image area on visual perception of the color of the selected image area; and
    an output outputting the image including the adjusted pixel signal values.

19. An image processing method for carrying out image processing on an image, the image processing method comprising the steps of:
    inputting an image having a plurality of pixel signal values;
    selecting an area in the image;
    adjusting pixel signal values in the selected image area in order to adjust a density of the image at the selected image area based on density information of an area in the image surrounding the selected image area so as to compensate for an effect of density of the surrounding image area on visual perception of the density of the selected image area; and
    outputting the image including the adjusted pixel signal values.

* * * * *